United States Patent
Hünlich et al.

(10) Patent No.: US 6,304,845 B1
(45) Date of Patent: Oct. 16, 2001

(54) METHOD OF TRANSMITTING VOICE DATA

(75) Inventors: Klaus Hünlich, Neuching; Wolfgang Fraas, Wolfratshausen, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/632,338

(22) Filed: Aug. 3, 2000

Related U.S. Application Data

(63) Continuation of application No. PCT/DE98/03812, filed on Dec. 30, 1998.

(30) Foreign Application Priority Data

Feb. 3, 1998 (DE) .............................................. 198 04 189

(51) Int. Cl.⁷ .................................................. G10L 13/02
(52) U.S. Cl. ......................... 704/259; 704/254; 704/249
(58) Field of Search .................................... 704/254, 259, 704/232, 255, 258, 200, 270.1, 249, 251, 231, 201, 500

(56) References Cited

U.S. PATENT DOCUMENTS

| | | | |
|---|---|---|---|
| 5,285,522 | 2/1994 | Müller | 704/232 |
| 5,457,770 | 10/1995 | Miyazawa | 704/255 |
| 5,687,286 | * 11/1997 | Bar-Yam | 704/232 |
| 5,832,435 | * 11/1998 | Silverman | 704/260 |
| 5,890,117 | * 3/1999 | Silverman | 704/260 |

FOREIGN PATENT DOCUMENTS

| | | | |
|---|---|---|---|
| 35 13 243 C2 | 3/1993 | (DE) | G10L/5/04 |
| 0 071 716 A2 | 2/1983 | (EP) | G10L/1/00 |
| 0 423 800 B1 | 2/1995 | (EP) | G10L/5/06 |
| 0 706 172 A1 | 4/1996 | (EP) | G10L/5/06 |

OTHER PUBLICATIONS

"Review of Neural Networks for Speech Recognition" (Lippmann), dated 1989, Massachusetts Institute of Technology, pp. 1–38.

"Speech recognition through phoneme segmentation and neural classification" (Piuri et al.), dated May 19, 1997, XP–000730875, pp. 1215–1220.

"Information und Codierung" (Hamming), German translated of Coding and Information Theory by Hamming, pp. 81–97, as mentioned on p. 2 of the specification.

Published International Application No. WO 96/00962 (Lyberg), dated Jan. 11, 1996.

"The Meta–Pi Network: Connectionist rapid adaptation for high–performance milti–speaker phoneme recognition" (Hampshire et al.), dated 1990, XP 000146430, pp. 165–168.

\* cited by examiner

Primary Examiner—Richemond Dorvil
(74) Attorney, Agent, or Firm—Herbert L. Lerner; Laurence A. Greenberg; Werner H. Stemer

(57) ABSTRACT

In a transmission of voice data, the stream of voice data is first decomposed into phonemes. For each phoneme a code symbol which is assigned to that specific phoneme in a selectable voice-specific and/or speaker-specific phoneme catalog is transmitted to a voice synthesizer at the transmission destination. The amount of data which has to be transmitted is generally greatly reduced. The decomposition of the stream of voice data into phonemes is carried out by a neural network which is trained to detect the phonemes stored in the selected voice-specific and/or speaker-specific phoneme catalog. The voice synthesizer reconverts the stream of received code symbols into a sequence of phonemes and outputs it.

20 Claims, 1 Drawing Sheet

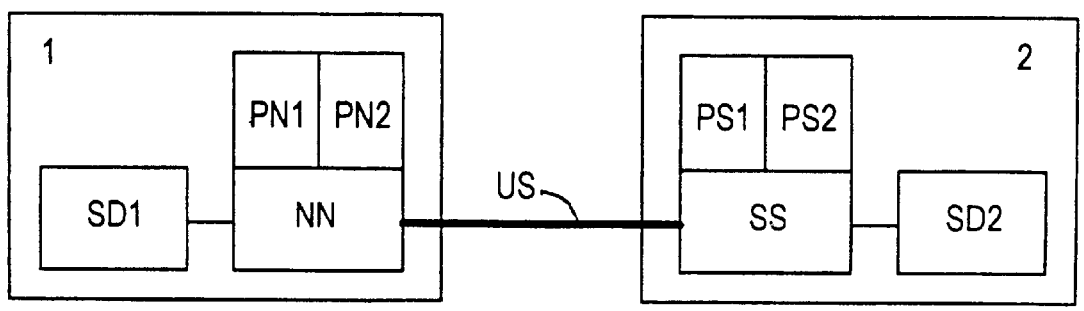

METHOD OF TRANSMITTING VOICE DATA

CROSS-REFERENCE TO RELATED APPLICATION

This is a continuation of copending international application PCT/DE98/03812, filed Dec. 30, 1998, which designated the United States.

BACKGROUND OF THE INVENTION

Field of the Invention

The invention lies in the communications field. More specifically, the present invention relates to a method for transmitting voice data wherein the voice data are compressed before transmission and decompressed at the transmission destination. The compression is thereby based on a decomposition of the voice data into phonemes. Phonemes are the acoustic language elements which are essential for the perception of spoken language.

It has been known in the art to compress voice data before transmission in a communications network in order to occupy as little transmission bandwidth as possible in the communications network. In these cases, when the voice is reproduced at the transmission destination the compressed voice data are returned to their original state, or to an equivalent state, by decompression. Because the reduction in the transmission band width which can be achieved by such a method depends directly on the compression rate of the compression method used, it is desirable to try to achieve the highest possible compression rate.

During voice transmission, the methods used for the compression are usually prediction methods which utilize the statistical unequal distribution of the data patterns occurring in voice data in order to reduce a high level of redundancy which is inherent in voice data. During the decompression process, the original voice data can be reconstructed from the compressed voice data virtually without falsification with the exception of small losses which are inherent in the process. The compression ratio which can thereby be achieved lies in the order or magnitude of approximately 1:10. Methods of that type are described, for example, by Richard W. Hamming in "Information und Codierung" [Information and Coding]", VCH Verlagsgesellschaft Weinheim, 1987, pages 81–97.

In typical voice data, information relating purely to the content forms only a small fraction of the entire voice information. The greatest part of the voice information comprises, as a rule, speaker-specific information which is expressed, for example, in nuances of the speaker's voice or the register of the speaker. When voice data are transmitted, essentially only the information relating to their content is significant, for example in the case of purely informative messages, automatic announcements or the like. For this reason it is possible, by reducing the speaker-specific information, also to achieve significantly higher compression rates than with methods which completely or virtually completely preserve the information payload of the voice data.

The smallest acoustic units in which language is formulated by the speaker and in which the information relating to the content—the spoken words—is also expressed are phonemes. U.S. Pat. No. 4,424,415 (see European patent EP 71716 B1), German patent DE 3513243 C2, and European patent EP 423800 B1 have heretofore disclosed arrangements and methods in which a stream of voice data is analyzed for the phonemes contained in it and converted into a stream of code symbols which are respectively assigned to the phonemes detected, in order to compress the voice data before transmission.

A significant problem here is the reliable detection of the phonemes from which any stream of voice data which are to be transmitted is composed. This is made difficult in particular as a result of the fact that the same phoneme can be realized very differently depending on the speaker and the speaker's linguistic habits. If phonemes are not detected within the stream of voice data or assigned to incorrect sounds, the transmission quality of the language is impaired—possibly to the point of incomprehensibility. Reliable phoneme analysis is therefore an important criterion for the quality and/or the range of application of such voice transmission methods.

SUMMARY OF THE INVENTION

The object of the invention is to provide a voice data transmission method which overcomes the above-noted deficiencies and disadvantages of the prior art devices and methods of this kind, and which presents a flexible and efficient method in which voice data can be compressed by means of an improved phoneme analysis before transmission.

With the above and other objects in view there is provided, in accordance with the invention, a method of transmitting voice data from a voice data source to a transmission destination. The method comprises the following steps:

selecting a specific phoneme catalog assigned to a given subscriber in dependence on an identifier of the subscriber transmitting voice data, the phoneme catalog having stored therein phonemes corresponding to given voice data patterns, and each phoneme being respectively assigned an unambiguous code symbol;

feeding the voice data to be transmitted to a neural network trained to detect phonemes stored in the specific phoneme catalog and analyzing the voice data for the phonemes contained therein with the neural network;

for the phonemes detected in the voice data, determining the code symbols respectively assigned to the phonemes in the selected phoneme catalog;

transmitting the code symbols to a voice synthesizer at a transmission destination;

converting the stream of received code symbols with the voice synthesizer into a sequence of phonemes respectively assigned to the code symbols in a phoneme catalog; and outputting the sequence of phonemes.

In accordance with an alternative embodiment of the invention, there is provided a method of transmitting voice data from a voice data source to a transmission destination using phoneme catalogs in which voice data patterns corresponding to phonemes are stored, and each phoneme is respectively assigned an unambiguous code symbol, the method which comprises the following steps:

feeding voice data to be transmitted to a neural network trained to detect voice data variations selected from the group consisting of various languages and various speakers and to detect one of a language to which the voice data to be transmitted belong and a speaker from which the voice data to be transmitted originate, and causing with the neural network a given phoneme catalog assigned to the voice data variation to be selected;

feeding the voice data to a neural network trained to detect the phonemes stored in the phoneme catalog, to analyze the voice data for the phonemes contained therein, and being trained to detect the voice data to be transmitted;

determining, for the phonemes detected in the voice data, a code symbol respectively assigned to the phonemes in the selected phoneme catalog;

transmitting the code symbols to a voice synthesizer at a transmission destination;

converting a stream of received code symbols with the voice synthesizer into a sequence of phonemes respectively assigned to the code symbols in a phoneme catalog; and outputting the sequence of phonemes.

In other words, voice data which are to be transmitted from a voice data source to a transmission destination are subjected to a phoneme analysis before the actual transmission. In order to apply the method, the voice data may be present in a wide variety of forms; for example in analog or digitized form or as feature vectors describing voice signals, in each case in representations which are resolved in terms of time and/or frequency. The phoneme analysis is carried out according to the invention by means of a neural network which is trained to detect phonemes. The principles of a detection of voice and/or phonemes by means of neural networks are described, for example, in "Review of Neural Networks for Speech Recognition" by R. P. Lippmann in Neural Computation 1, 1989, pages 1–38.

The phonemes according to which the stream of voice data is to be analyzed and with respect to which the neural network is trained are stored in voice-specific and/or speaker-specific phoneme catalogs in which an unambiguous code symbol, for example an index or a number, is respectively assigned to them. Language can be understood in this context to be, inter alia, natural languages, regional dialects and expressions of language peculiarities. The voice- specific and/or speaker-specific phoneme catalogs can be produced in a preparatory step of the method according to the invention, by analyzing representative voice data which belong to respective different languages and/or originate from different speakers. Here, those acoustic language elements which prove characteristic for the respective representative voice data, or a representative ideal form of these language elements, are stored as phonemes in the respective phoneme catalog. The analysis of the representative voice data can in particular also be carried out using a neural network. In addition, the selection of representative voice data and/or their characteristic language elements can advantageously be adapted to peculiarities of the voice data to be transmitted, for example background noises or the like.

In accordance with an added feature of the invention, the phoneme catalog is a voice-specific and/or a speaker-specific phoneme catalog.

A phoneme catalog can be implemented, for example, as a conventional memory and/or as part of a trained neural network. In the latter case, it is possible to represent the stored phonemes by means of an internal state of the trained neural network. Furthermore, the so-called weighting matrix which determines the learning state of the neural network can be configured as a phoneme catalog. Such a weighting matrix can be read out of a trained neural network, stored in a memory and, when necessary, read into any neural network which thus becomes an appropriately trained neural network.

In accordance with a corresponding feature of the invention, the method further comprises transmitting information relating to a phoneme catalog being used in the phoneme analysis of the voice data to be transmitted to the voice synthesizer at the transmission destination, to enable the transmitted voice data to be reconstructed.

In accordance with another feature of the invention, the stream of code symbols to be transmitted is compressed prior to the transmission with a further compression method and the stream of code symbols is decompressed at the transmission destination.

Before the phoneme analysis of the voice data by means of a neural network, one of the voice-specific and/or speaker-specific phoneme catalogs is firstly selected and the voice data are subsequently fed for the phoneme analysis to the neural network which is trained to detect the phonemes stored in the selected phoneme catalog. The selection of the phoneme catalog can be carried out here as a function of an identifier of a subscriber transmitting the voice data which are to be transmitted or brought about by a voice-distinguishing and/or speaker-distinguishing neural network which is trained to detect the language to which the voice data which are to be transmitted belong and/or the speaker from which the voice data that are to be transmitted originate.

For the phonemes which are detected in the voice data during the phoneme analysis, the code symbol which is respectively assigned to those data in the selected phoneme catalog is determined and transmitted to the transmission destination instead of the voice data pattern corresponding to the respective phoneme. Because the transmitted code symbols are generally significantly shorter than the voice data patterns which are represented by them, the amount of data which is to be transmitted is generally significantly reduced and a high compression rate is thus achieved. At the transmission destination, the received code symbols are fed to a voice synthesizer which converts the stream of code symbols back into a sequence of phonemes and outputs it. In order to replace the received code symbols with phonemes which are to be output, the voice synthesizer also accesses a phoneme catalog here. The compression rate can possibly be increased further by compressing the stream of code symbols before it is transmitted by using a further compression method and decompressing it again at the transmission destination before feeding it to the voice synthesizer.

Using speaker-specific and/or voice-specific phoneme catalogs increases the reliability of the phoneme analysis and thus also the quality of the voice synthesis in particular when transmitting voice data which originate from various speakers.

Furthermore, the selection of the phoneme catalog on which the voice synthesis is based enables the reproduction of the voice data also to be adapted to predefinable requirements, for example in order to simulate specific speakers or language peculiarities or in order to draw attention to particular circumstances by changing the speaker's voice.

In accordance with a further feature of the invention, the method further comprises updating a phoneme catalog during a voice transmission with the voice data to be transmitted. In this variation of the invention, a phoneme catalog can be updated—if appropriate repeatedly—during a transmission of voice data by analyzing these voice data which are to be specifically transmitted and/or the neural network can be trained further by means of the voice data which are to be transmitted. In this way, the phoneme analysis and/or the voice synthesis can also be adapted to short-term changes in language properties.

According to one development of the invention, information relating to a phoneme catalog used during the phoneme analysis can be transmitted to the voice synthesizer. In this way, it is possible, for example, to indicate to the voice synthesizer a change in a phoneme catalog, for example due to a change of speaker or language or to transmit the phoneme catalog in its entirety or partially if a phoneme catalog which is to be used is not yet present there. Changes or updates in phoneme catalogs can thus also be transmitted to the voice synthesizer and thus made available there.

In accordance with again an added feature of the invention, the voice synthesizer outputs the phonemes with adjustable parameters such as length, volume, intonation, register, and speaker's voice. In other words, the various parameters which are relevant to the generation of phonemes, can be set at the voice synthesizer; preferably for each individual phoneme. The reproduction of the transmitted voice data can thus be adapted to different requirements. For example, the reproduction quality can generally be improved by extracting sound peculiarities and/or peculiarities of the speaker's voice, for example the volume and pitch of syllables or similar language elements, from the voice data which are to be transmitted before compression and transmitting them to the voice synthesizer in order to set reproduction parameters. The reproduction parameters can also be set as a function of an identifier of a subscriber transmitting the voice data in order to be able to allow subscriber—specific elements to be included in the voice reproduction, which elements enable the subscriber to be identified by means of the reproduced speaker's voice, for example.

In accordance with again an additional feature of the invention, therefore, prior to compressing the stream of code symbols, peculiarities of the speaker's voice are extracted from the voice data to be transmitted and the peculiarities are transmitted to the voice synthesizer for setting there the adjustable parameters (e.g., length, volume, intonation, register, speaker's voice) for outputting the phonemes.

In accordance with yet another feature of the invention, the identifier of the subscriber transmitting the voice data is transmitted to the voice synthesizer and the adjustable parameters are set in dependence on the identifier.

In accordance with a concomitant feature of the invention, the voice data to be transmitted is buffered in the form of code symbols in a memory before transmission from the voice data source to the transmission destination. This allows the data to be called later once or repeatedly. By reducing the voice data to code symbols which represent the phonemes, significantly less storage space is, as a rule, required for them than for buffering the unchanged voice data.

Moreover, the code symbols which represent phonemes form a possible starting point for a wide range of further processing of the voice data. For example, the code symbols can be converted into groups of letters corresponding to the associated phonemes and in this way the voice data can be output as text. A large number of current methods for automatic voice recognition are also based on a decomposition of the voice into phonemes and can therefore be combined directly with the method according to the invention.

Other features which are considered as characteristic for the invention are set forth in the appended claims.

Although the invention is illustrated and described herein as embodied in a method for transmitting voice data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE shows a schematic representation of two communications systems which are connected over a transmission link.

DESCRIPTION OF THE PREFERRED EMBODIMENTS

Referring now to the sole figure of the drawing in detail there is shown a communications system 1 which functions as a transmitter of voice data and a communications system 2 which is connected to the latter over a transmission link US and which functions as a receiver of the voice data. The communications system 1 contains, as functional components, a voice data source SD1 and a neural network NN which is connected thereto, with access to speaker-specific phoneme catalogs PN1 and PN2. The communications system 2 includes a voice synthesizer SS which is coupled to speaker-specific phoneme catalogs PS1 and PS2 and a voice data sink SD2 which is connected to the voice synthesizer SS.

The restriction to two speaker-specific phoneme catalogs per communications system is to considered here merely as exemplary and serves to simplify the following explanation.

Phonemes which have been detected as characteristic acoustic language elements by analyzing representative voice data are respectively stored in the speaker-specific phoneme catalogs PN1 and PN2. The representative voice data which were used to produce the phoneme catalogs PN1, PN2 originate here from a specific speaker for each phoneme catalog. A code symbol which unambiguously relates to the respective phoneme catalog and can be called is respectively assigned to the stored phonemes.

The neural network NN is trained to detect the phonemes, stored in the phoneme catalogs PN1, PN2, within a stream of voice data. It is thereby possible to select which of the phoneme catalogs PN1, PN2 will be used as the basis for the phoneme analysis. This selection can be made, for example, by superimposing a so-called weighting matrix on the neural network which corresponds to the respective phoneme catalog PN1 or PN2.

In the exemplary embodiment, a stream of voice data which originates from the voice data source SD1 is to be transmitted by the communications system 1 to the voice data sink SD2 in the communications system 2, and the voice data are to be compressed before the actual transmission. For this purpose, firstly an identifier of a subscriber transmitting the voice data is fed from the voice data source SD1 to the neural network NN. The latter selects, as a function of the transmitted identifier, a speaker-specific phoneme catalog—PN1 in this case—assigned to this subscriber, for the following phoneme analysis. The identifier is subsequently transmitted onward to the communications system 2.

Then, the stream of voice data which are to be transmitted is fed to the neural network NN which classifies voice data patterns occurring in the stream of voice data according to the phonemes stored in the selected phoneme catalog PN1. For each voice data pattern which can be successfully assigned to a stored phoneme, instead of the voice data pattern the code symbol which is assigned to the stored phoneme in the phoneme catalog is transmitted to the communications system 2 over the transmission link US. Voice data patterns which cannot be successfully assigned to a stored phoneme are transmitted in unchanged form— characterized by a specific code symbol which does not correspond to code symbols assigned to the phonemes.

In the communications system 2, a phoneme catalog— PS1 in this case—on which the following voice synthesis is based is firstly selected as a function of the transmitted identifier. The subsequently received stream of code symbols is then fed to the voice synthesizer SS which generates for each code symbol the phoneme which is assigned to it in the selected phoneme catalog PS1 and feeds it to the voice data sink SD2. The voice data patterns which are characterized by the specific code symbol and are transmitted in unchanged form are passed directly to the voice data sink SD2. In this way, the stream of voice data is approximately reconstructed or decompressed again.

The phoneme catalogs PS1 and PS2 are implemented in the exemplary embodiment as conventional memories in which each code symbol which they contain is assigned an information item which is necessary to generate the associated phoneme in the voice synthesizer SS. The phoneme catalogs PS1 and PS2 can be produced by calling or reading out the phoneme catalogs PN1 and PN2, respectively.

We claim:

1. A method of transmitting voice data from a voice data source to a transmission destination, the method which comprises the following steps:

selecting a specific phoneme catalog assigned to a given subscriber in dependence on an identifier of the subscriber transmitting voice data, the phoneme catalog having stored therein phonemes corresponding to given voice data patterns, and each phoneme being respectively assigned an unambiguous code symbol;

feeding the voice data to be transmitted to a neural network trained to detect phonemes stored in the specific phoneme catalog and analyzing the voice data for the phonemes contained therein with the neural network;

for the phonemes detected in the voice data, determining the code symbols respectively assigned to the phonemes in the selected phoneme catalog;

transmitting the code symbols to a voice synthesizer at a transmission destination;

converting the stream of received code symbols with the voice synthesizer into a sequence of phonemes respectively assigned to the code symbols in a phoneme catalog; and outputting the sequence of phonemes.

2. The method according to claim 1, wherein the phoneme catalog is selected from the group consisting of a voice-specific and a speaker-specific phoneme catalog.

3. The method according to claim 1, which comprises buffering, as code symbols in a memory, the voice data to be transmitted from the voice data source to the transmission destination.

4. The method according to claim 1, which comprises transmitting information relating to a phoneme catalog being used in the phoneme analysis of the voice data to be transmitted to the voice synthesizer at the transmission destination, to enable the transmitted voice data to be reconstructed.

5. The method according to claim 1, which comprises updating a phoneme catalog during a voice transmission with the voice data to be transmitted.

6. The method according to claim 1, which comprises training the neural network during a voice transmission to detect the voice data to be transmitted.

7. The method according to claim 1, which comprises compressing the stream of code symbols to be transmitted prior to the transmission with a further compression method and decompressing the stream of code symbols at the transmission destination.

8. The method according to claim 1, wherein the outputting step comprises outputting with the voice synthesizer the phonemes with adjustable parameters selected from the group consisting of a length, a volume, an intonation, a register, and a speaker's voice.

9. The method according to claim 8, which comprises, prior to a compressing the stream of code symbols, extracting peculiarities of the speaker's voice from the voice data to be transmitted and transmitting the peculiarities to the voice synthesizer for setting there the adjustable parameters for outputting the phonemes.

10. The method according to claim 8, which comprises transmitting the identifier of the subscriber transmitting the voice data to the voice synthesizer and setting the adjustable parameters in dependence on the identifier.

11. A method of transmitting voice data from a voice data source to a transmission destination using phoneme catalogs in which voice data patterns corresponding to phonemes are stored, and each phoneme is respectively assigned an unambiguous code symbol, the method which comprises the following steps:

feeding voice data to be transmitted to a neural network trained to detect voice data variations selected from the group consisting of various languages and various speakers and to detect one of a language to which the voice data to be transmitted belong and a speaker from which the voice data to be transmitted originate, and causing with the neural network a given phoneme catalog assigned to the voice data variation to be selected;

feeding the voice data to a neural network trained to detect the phonemes stored in the phoneme catalog, to analyze the voice data for the phonemes contained therein, and being trained to detect the voice data to be transmitted;

determining, for the phonemes detected in the voice data, a code symbol respectively assigned to the phonemes in the selected phoneme catalog;

transmitting the code symbols to a voice synthesizer at a transmission destination;

converting a stream of received code symbols with the voice synthesizer into a sequence of phonemes respectively assigned to the code symbols in a phoneme catalog; and outputting the sequence of phonemes.

12. The method according to claim 11, wherein the phoneme catalog is selected from the group consisting of a voice-specific and a speaker-specific phoneme catalog.

13. The method according to claim 11, which comprises buffering, as code symbols in a memory, the voice data to be transmitted from the voice data source to the transmission destination.

14. The method according to claim 11, which comprises transmitting information relating to a phoneme catalog being used in the phoneme analysis of the voice data to be transmitted to the voice synthesizer at the transmission destination, to enable the transmitted voice data to be reconstructed.

15. The method according to claim 11, which comprises updating a phoneme catalog during a voice transmission with the voice data to be transmitted.

16. The method according to claim 11, which comprises training the neural network during a voice transmission to detect the voice data to be transmitted.

17. The method according to claim 11, which comprises compressing the stream of code symbols to be transmitted prior to the transmission with a further compression method and decompressing the stream of code symbols at the transmission destination.

18. The method according to claim 11, wherein the outputting step comprises outputting with the voice synthesizer the phonemes with adjustable parameters selected from the group consisting of a length, a volume, an intonation, a register, and a speaker's voice.

19. The method according to claim 18, which comprises, prior to a compressing the stream of code symbols, extracting peculiarities of the speaker's voice from the voice data to be transmitted and transmitting the peculiarities to the voice synthesizer for setting there the adjustable parameters for outputting the phonemes.

20. The method according to claim 18, which comprises transmitting the identifier of the subscriber transmitting the voice data to the voice synthesizer and setting the adjustable parameters in dependence on the identifier.

* * * * *